United States Patent [19]

Callahan et al.

[11] 4,166,376

[45] Sep. 4, 1979

[54] FLUIDIZED SOLIDS PARTICLE DISCHARGE DEVICE

[75] Inventors: Joseph T. Callahan, 131 Heath Rd., Medford, N.J. 08055; Charles R. Delp, 415 Juniper St., Carlisle, Pa. 17013

[73] Assignees: Joseph Callahan, Medford, N.J.; Charles Delp, Carlisle, Pa.

[21] Appl. No.: 896,809

[22] Filed: Apr. 17, 1978

[51] Int. Cl.² .............................................. G01C 25/00
[52] U.S. Cl. ........................................................ 73/1 F
[58] Field of Search ............................... 73/1 F, 15 R; 165/104 F; 23/288 S; 148/128, 129, 149

[56] References Cited

U.S. PATENT DOCUMENTS

| | | | |
|---|---|---|---|
| 2,299,867 | 10/1942 | Wolfson | 73/1 F |
| 3,350,915 | 11/1967 | Staffin | 73/1 F |

Primary Examiner—Jerry W. Myracle
Attorney, Agent, or Firm—Charles I. Brodsky

[57] ABSTRACT

The described apparatus is designed to be inserted into a fluidized solids temperature calibration bath to eliminate dusting, particle impingement and test instrument temperature environmental problems.

10 Claims, 3 Drawing Figures

FLUIDIZED SOLIDS PARTICLE DISCHARGE DEVICE

FIELD OF THE INVENTION

This invention relates to fluidized solids temperature calibration baths, in general, and to a particle discharge device which permits the accurate and safe use of such equipment, in particular.

BACKGROUND OF THE INVENTION

As is well known and understood by those skilled in the art, temperature calibration baths using heat treating salts, or oils, as the calibration medium are being replaced, in many instances, by baths using fluidized solids. As will be appreciated, this use of fluidized solids, such as aluminum oxide, as the calibration medium, served to reduce the possibility of explosion or fire hazard, which were sometime experienced when salts or oils were used. In these regards, the bath was primarily used for thermometer calibration work, and safer to use because the medium is chemically inert, and the danger from spitting, splashing, or spilling type accidents is reduced.

Experience has shown, however, that there exist a series of problems with these fluidized solids temperature calibration baths which both limit their accuracy and their usefulness. Characteristic of such baths is that air flows up through the bottom of the fluidized bed, and fluidizes the solid particles, usually of 100–180 mesh size, with the air then exiting the bath through the top of an open reservoir. With the bath temperature being maintained and controlled by immersion heaters, it has been found that the exiting air carries the aluminum oxide, or other particles along with it ("dusting"), to be deposited on nearby surfaces. Such "dusting" effect presents a potential health hazard for operating personnel, the potential for damage to the test instruments being calibrated, and the possibility of having an adverse effect on the calibration accuracy. Secondly, as the temperature of the bath might run relatively high, e.g., to 1500° F., the exiting air may cause damage to the parts of the instrument located outside the bath—for example, to the heads, to electrical connectors, to dial faces, etc., as well as causing inaccuracies in calibrated readings. With certain temperature sensitive instruments to be calibrated, furthermore, difficulties were encountered in immersing the instrument to the proper depth in the fluidized bath necessary to obtain an accurate indication of bath temperature, for to do so, led to the undesirable intrusion of the fluidized particles into vital parts of the instrument and/or an overheating of vulnerable parts. Temperature sensitive switches, in this regard, were particularly affected by the fluidized particles getting into their working parts. Thus, while, in general, overcoming many of the disadvantages associated with salt and oil type calibration baths, the fluidized solids calibration baths have shown to pose a potential health hazard to temperature calibration bath operators that are exposed to breathing airborne particles during the calibration process, and have an adverse effect on the calibration of temperature measuring test instruments by subjecting them to excessive case temperatures.

SUMMARY OF THE INVENTION

As will become clear hereinafter, a fluidized solids particle discharge device embodying the invention was constructed of a bucket-like structure, consisting of an upper and lower ring, a removable nonmetallic base plate (made of Transite or equivalent hard thermal insulating material, for example), and walls made up of an inner and outer sheet cylinder separated by an annular space through which a cooling fluid, such as air, is caused to flow. With the sensor part of the temperature measuring test instrument extending through the nonmetallic base plate into the fluidized bed, and with the instrument case and/or vulnerable parts housed within the bucket-like structure, the apparatus of the invention was found to substantially eliminate all "dusting" and particle impingement on the temperature measuring test instrument, by effecting a mechanical seal between the fluidized solids particle discharge device and the temperature calibration bath, and by using the thermal insulating material as a barrier between the fluidized solids bed and the temperature instruments. Besides its use as a mechanical barrier, the thermal insulating material was also found effective in reducing the amount of heat undesirably transmitted from the fluidized solids bed to the temperature instrument being calibrated, which, in turn, was found further reduced by the circulating cooling air which lowered the wall temperature of the apparatus of the invention.

BRIEF DESCRIPTION OF THE DRAWING

These and other features of the present invention will be more clearly understood from a consideration of the following description, taken in connection with the accompanying drawing, in which.

DETAILED DESCRIPTION OF THE DRAWING

Figure 1:
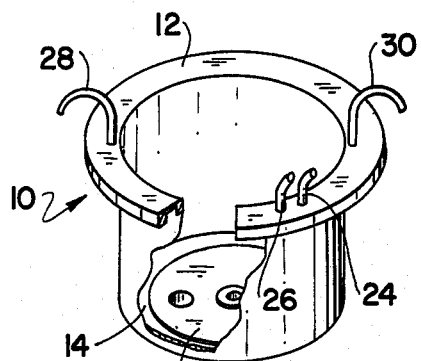
FIG. 1 is an isometric view, partially in cut-away form, of a preferred embodiment of the fluidized solids particle discharge device constructed in accordance with the invention.

Referring now to the drawing, the fluidized solids particle discharge device 10 is generally in the form of a bucket-like structure having an upper ring 12 and a lower ring 14. A removable nonmetallic base plate 16 is also included, constructed of Transite or equivalent hard thermal insulating material, with inner and outer walls 18, 20, constructed to form a sheet metal cylinder. These walls 18, 20 are separated by an annular space 22, through which a cooling fluid, usually air, is caused to flow—for example, by compressed air introduced into the annular space through a stainless steel tube 24 which, in turn, exits through a second stainless steel tube 26 and muffler cap (not shown). When the two stainless steel tubes 24, 26, are separated by a vertical divider plate (not shown, but extending vertically down in the annular space 22 between the walls 18, 20), compressed air entering through the inlet tube 24 is forced to circulate around the walls of the space 22, to exit through the second tube 26 and muffler cap, which serves to reduce any noise which might emanate from the exiting air. A pair of standpipes 28, 30 extend through the top ring 12, to permit air to circulate upwards from the fluidized bed, and outwardly therefrom, but are selected of narrow cross-section and of a reversed bend and shape so as to prevent measurable carry-over of fluidized particles into the exiting air. An adapter 32 is used to secure a thermometer, or other heat sensitive device, the probe end of which extends through the underlying aperture 34 into the fluidized solid calibration medium. A second aperture 36 is provided, through which a thermometer extends into the fluidized bed, to serve as a "standard" against which comparisons and/or calibrations are being measured.

Figure 2:
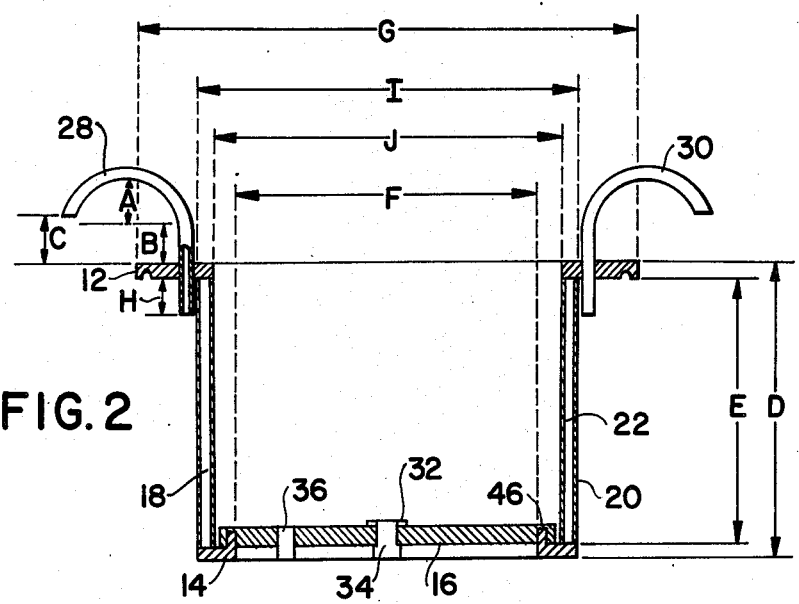
FIG. 2 is a front-sectional view of the invention.

In use, the upper ring 12 serves to cap the annular space 22 and to provide a flange which rests on top of the bath 42 (FIG. 3) or on the top edge of the bath reservoir 40, thereby holding the fluidized solids particle discharge device 10 in place when in use. An insulating gasket material 44 (Kaowool or equivalent) is situate between the upper ring 12 and the bath or reservoir top, to prevent air and solid particles from escaping therefrom. The lower ring 14, on the other hand, similarly serves to cap the annular space 22, and also to provide a flange which holds the removable base plate 16. With a second gasket 46 (FIG. 2) used between the base plate 16 and the top of the lower ring 14 so as to seal that joint, it will be apparent that these gaskets 44 and 46 additionally serve to provide thermal insulation so as to aid in cooling the upper ring 12 and base plate 16.

Figure 3:
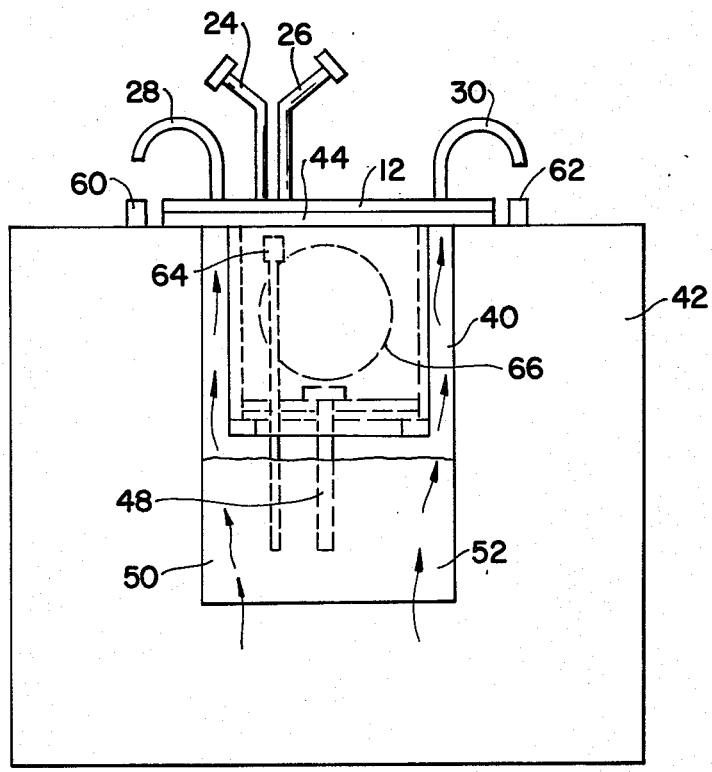
FIG. 3 schematically illustrates one manner of using the particle discharge device, helpful in an understanding of the invention.

Those skilled in the art will appreciate that the base plate 16 is drilled to permit insertion of variously shaped temperature standards and temperature sensing devices which it is desired to calibrate. Such drillings may be counterbored or otherwise shaped, where possible, so as to seal against air and particles escaping around the inserted instruments. Kaowool or equivalent soft blanket type insulation materials may be used as a packing around the insertion holes, where necessary, to insure this. The thickness of the base plate 16 can additionally be varied to provide the correct immersion depth of the probe or sensor 48 of the device to be calibrated, with such depth into the fluidized solids 50 being also controllable somewhat by varying the thickness of the upper or lower ring gaskets. As indicated in FIG. 3 cooling air is introduced through tube 24, and after flowing through the annular space 22, exits through tube 26. A pair of beakers 60, 62 are employed to collect any particle carry-over which is able to transmit through the standpipes 28, 30. Air flowing through the fluidized solids 52 permits a heating of the solids by immersion heaters (not shown), but the particles are prevented from entry into the structure 10 due to the lower ring 14 and base plate 16 serving as mechanical barriers. In such manner, both the "standard" thermometer 64 and test instrument 66 have their heads, connections, and critical parts protected from the grit particles. Additionally, the insulating plate 16 and the cooled walls of the reservoir serve to maintain the temperature in the bucketlike structure substantially lower than that in the fluidized bed, which can be as high as 1500° F. for certain kinds of temperature tests.

In one construction of the invention, the following dimensions could be employed:

| A | 2 inch radius | F | 9 inches |
|---|---|---|---|
| B | 2 inches | G | 13 3/4 inches |
| C | 2 1/2 inches | H | 1/2 inch |
| D | 3 5/16 inches | I | 11 1/8 inches |
| E | 3 3/16 inches | J | 10 5/8 inches | with an annular space 22 of ⅛ inch gap and wall thicknesses 18, 20, of 1/16 inch each.

Various advantages and features followed from the use of the fluidized solids particle discharge device of the invention. For example, the device prevents particles from escaping the bath, thereby protecting personnel and equipment in the calibration room from possible harm which might result from the introduction of particulates into the ambient air. Additionally, the apparatus prevents particles and heated air from impinging on vulnerable parts of the temperature sensitive devices being calibrated in the bath. Furthermore, both these features are accomplished without any need for additional energy, or space, and requires little or no maintenance because no moving parts are employed. Furthermore, the device of the invention shields the heat sensitive devices from the hot walls of the bath reservoir and surrounds them with relatively cool air—which, together with the feature of preventing hot air and hot particle impingement on the heat sensitive test instrument, protects them from damage or from inaccuracy during calibration, thus providing a suitable temperature environment for the calibration work to proceed. When considered with the ability of the device to control immersion depth so as to make possible the ability to immerse the temperature sensitive portion in the solid sufficiently to obtain proper measurements of bath temperature, it will be seen that the invention permits the accurate and safe use of current and future fluidized solids temperature calibration equipment. Also, the circulating medium protects the user from burning himself on the hot reservoir walls, while the standpipes, besides limiting the escape of the fluidized particles, permits sufficient circulation of air to maintain the bed and keep it from collapsing.

While there has been described what is considered to be a preferred embodiment of the present invention, it will be readily apparent to those skilled in the art that modifications may be made without departing from the scope of the teachings herein of providing a separate device designed for insertion into a fluidized solids bath to eliminate dusting, particle impingement and environment problems. For example, whereas the invention has been described in the specific context of test instrument calibration, it will be evident that its usefulness extends to other applications of fluidized baths, as where instrumentation, equipments and other apparatus are to be subjected to heat treating, etc., in which only a portion of the arrangement is immersed within the bath, while external portions may be adversely affected by particle impingement. For at least such reason, therefore, resort should be had to the claims appended hereto for a correct understanding of this invention.

We claim:

1. For use in fluidized solid particulate baths for calibrating test instruments having temperature sensitive components, apparatus comprising:

first means for securing said test instruments such that substantially only the temperature sensitive components thereof extend into said bath;

said means having a first member through which said temperature sensitive components extend, and forming a mechanical barrier to penetration by solid particulates of said bath;

and said means also having a second, thermal insulation member adjacent said first member on a side nearer said test instrument and through which said temperature sensitive components also extend, said second member forming a thermal insulating barrier to insulate the remainder of said test instruments from the temperatures of said fluidized bath.

2. For use in fluidized solid particulate baths for calibration test instruments having temperature sensitive components, apparatus comprising:
first means for securing said test instruments such that substantially only the temperature sensitive components thereof extend into said bath;
said means having a first member through which said temperature sensitive components extend, and forming a mechanical barrier to penetration by solid particulates of said bath;
and said means also having a second member adjacent said first member, through which said temperature sensitive components also extend, and forming a thermal insulating barrier to insulate the remainder of said test instruments from the temperatures of said fluidized bath;
wherein said first means also has third and fourth members positioned to form a space therebetween, and wherein said apparatus also includes second means for introducing a circulating medium to cool said space between said third and fourth members.

3. The apparatus of claim 2 wherein said second means introduces said cooling medium at a first portion of said space between said third and fourth members, and wherein said apparatus also includes third means for exhausting said medium from said space at a second portion thereof, so as to maintain the circulation of said medium in said space.

4. The apparatus of claim 3 wherein said first member comprises a lower ring, wherein said second member comprises a thermal insulating material atop said ring, wherein said third and fourth members comprise inner and outer walls, respectively, of said test instrument securing means, and wherein said second and third means comprise input and output ports for circulating a cooling medium for said inner and outer walls.

5. The apparatus of claim 3 wherein said first and said second members are configured to accept extension therethrough of said temperature sensitive components, and wherein said first and said second members are additionally configured to accept extension therethrough of temperature measuring devices against the readings of which said temperature sensitive components are to be compared.

6. The apparatus of claim 3 for use in fluidized solid particulate baths of the type in which air is passed through the solid particulate to control the temperature of said bath, wherein said apparatus also includes fourth means for sealing said bath from its surrounding environment, and wherein said apparatus additionally includes fifth means for exhausting an air flow from said particulate bath so as to maintain circulation in controlling bath temperatures.

7. The apparatus of claim 6 wherein said fourth means comprises an upper ring for said apparatus, and wherein said fifth means comprise output ports through said upper ring to permit said air exhaust.

8. The apparatus of claim 7 wherein there are also included sixth means for detecting said air exhaust for collecting any solid particulate that may be carried thereby.

9. The apparatus of claim 3 wherein said second and third means comprise input and output ports for circulating air as said cooling medium.

10. For use in fluidized solid particulate baths for subjecting portions of instrumentation, equipment and the like to temperature controls therein, apparatus comprising:
first means for securing said instrumentation, equipment and the like such that substantially only the portions to be subjected to temperature control extend into said bath;
said means having a first member through which said portions extend, and forming a mechanical barrier to penetration by solid particulates of said bath;
and said means also having a second, thermal insulation member adjacent said first member on a side nearer said instrumentation, equipment and the like and through which said portions also extend, said second member forming a thermal insulating barrier to insulate the remainder of said instrumentation, equipment and the like from the temperatures of said fluidized bath.

* * * * *